United States Patent [19]
Senda

[11] Patent Number: 5,782,352
[45] Date of Patent: Jul. 21, 1998

[54] CASE FOR ENCASING DISC CARTRIDGE THEREIN

[75] Inventor: Yutaka Senda, Tokyo, Japan

[73] Assignee: Fuji Photo Film Co., Ltd., Japan

[21] Appl. No.: 804,423

[22] Filed: Feb. 21, 1997

[30] Foreign Application Priority Data

Feb. 23, 1996 [JP] Japan .................. 8-036637

[51] Int. Cl.⁶ .................................. B65D 85/57
[52] U.S. Cl. ............ 206/308.3; 206/307; 206/232
[58] Field of Search .................. 206/1.5, 307, 308.3, 206/387.1, 493; 220/4.22, 334

[56] References Cited

U.S. PATENT DOCUMENTS

| | | | |
|---|---|---|---|
| 5,135,110 | 8/1992 | Morita | 206/387.1 |
| 5,242,049 | 9/1993 | Mizuno et al. | 206/308.3 |
| 5,361,898 | 11/1994 | Gottlieb | |
| 5,385,235 | 1/1995 | Ikebe et al. | 206/1.5 |
| 5,458,236 | 10/1995 | Klaus et al. | |
| 5,540,328 | 7/1996 | Kohtaka | 206/493 |

FOREIGN PATENT DOCUMENTS

| | | | |
|---|---|---|---|
| 0 411 237 A | 2/1991 | European Pat. Off. | G11B 23/023 |
| 0 493 845 A | 7/1992 | European Pat. Off. | G11B 23/023 |
| 0 502 572 A | 9/1992 | European Pat. Off. | G11B 33/04 |
| 0 531 113 A | 3/1993 | European Pat. Off. | G11B 33/04 |

*Primary Examiner*—David T. Fidei
*Attorney, Agent, or Firm*—Brinks Hofer Gilson & Lione; G. Peter Nichols

[57] ABSTRACT

A MD cartridge encasing case includes a box-shaped body having a space for receiving a disc cartridge therein and an inlet opening which is in communication with the space and through which the disc cartridge is to be introduced into the space. The box-shaped body includes a main case body and a closure member which is enabled to open and close relative to the main case body. It is possible to place an index sheet in a cartridge receiving space by opening the main case body and the closure member relative to each other, and fix the index sheet in the cartridge receiving space by closing the main case body and the closure member relative to each other. The encasing case is enabled to readily receive the index sheet therein and prevent the received index sheet from slipping out.

4 Claims, 3 Drawing Sheets

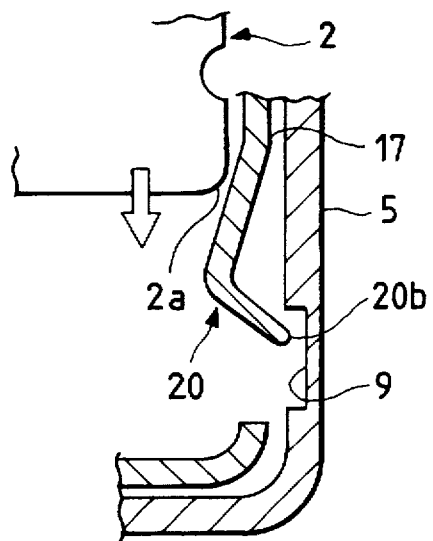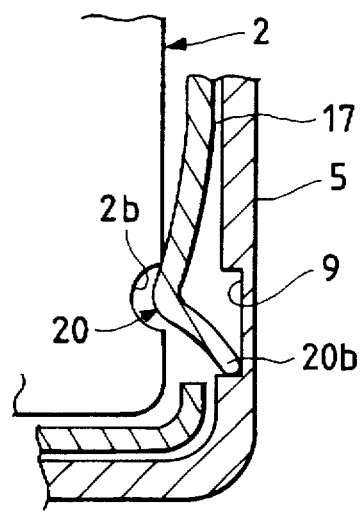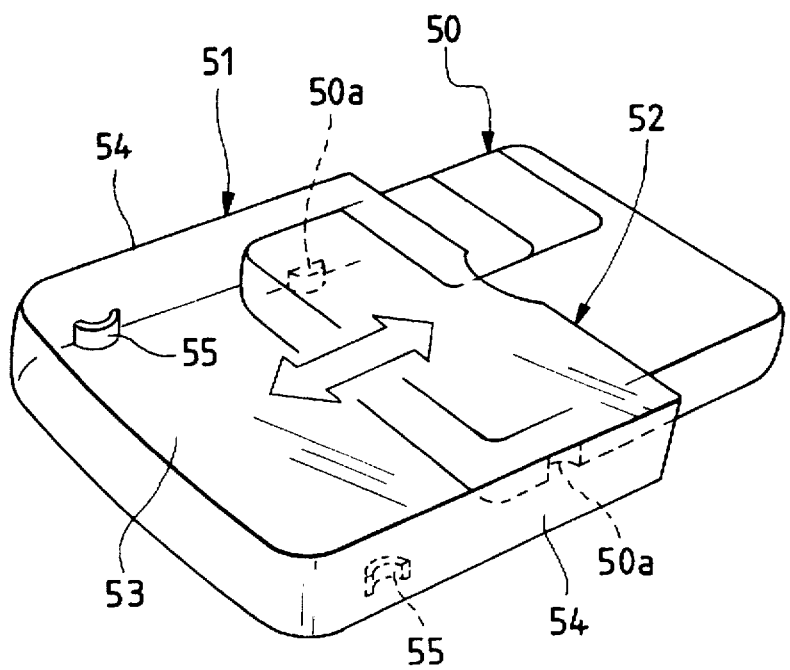

CASE FOR ENCASING DISC CARTRIDGE THEREIN

BACKGROUND OF THE INVENTION

The present Invention relates to a case for encasing therein a disc cartridge encasing a disc-shaped data record medium therein, and more particularly to a case for encasing therein a mini-disc cartridge encasing a 2.5 inch-diameter optical magnetic disc therein.

A disc cartridge is a cartridge encasing therein a data record medium such as a magnetic disc, optical disc and optical magnetic disc. AB one of such disc cartridges which have been recently able to be reduced in diameter with high densification of data to be recorded, a mini-disc cartridge, called MD, encasing therein a 2.5 inch-diameter mini-disc (hereinafter, referred to simply as MD cartridge) has been put to practical use.

In general, the MD cartridge is designed to have a come 51 as illustrated in FIG. 5 in order to protect the entire cartridge from external impacts, and prevent dust from entering thereinto, thereby ensuring easy preservation and making it easy to carry the MD cartridge.

As illustrated in FIG. 5, a conventional case 51 is of a parallelepipedon-shaped thin box formed with a space 53 to which a MD cartridge 50 is to be received, and has an inlet opening 52 through which the cartridge 50 is introduced into the space. Sidewalls 54, 54 partially defining the space 53 for receiving the cartridge therein are formed with arch-shaped spring members 55, 55. At least an upper wall of the case is made of transparent resin.

The spring members 55, 55 project into the space 53, and come into resilient engagement with recessed portions 50a, 50a formed with sidewalls of the MD cartridge 50, when the MD cartridge 50 is introduced into the space 53 through the inlet opening 52. Thus, the MD cartridge 50 is kept in the came 51 so as not to carelessly slip out of the case 51.

When an index sheet for indicating data recorded in a disc is to be positioned in the case 51, the index sheet has to be introduced into the narrow space 53 through the inlet opening 52. However, if a rather large index sheet is to be introduced into the space 53 in order for the index sheet not to escape out of the space, it is difficult to introduce theindex sheet into the space, which is inconvenient. On the other hand, if a rather small index sheet is to be used in order to make it relatively easy to introduce into the space 53, the index sheet is likely to be readily slip out of the apace. Thus, there has been conventionally used an adhesive to thereby adhere an index sheet onto a surface of the case 51.

However, adhering an index sheet onto a surface of the case 51 causes a problem that an index sheet readily becomes dirty, and thus becomes illegible.

SUMMARY OF THE INVENTION

It is an object of the present invention to solve a conventional problem by providing a case for encasing a disc cartridge therein, which case is able to readily receive an index sheet therein and prevent a received index sheet from slipping out thereof.

The above mentioned object can be accomplished by an encasing structure which includes a disc cartridge to be encased; a box-shaped body having a space for receiving the disc cartridge therein and an inlet opening which is in communication with the space for introducing the disc cartridge into the space, the box-shaped body including a main case body and a closure member which is enabled to open and close relative to the main case body; and an index sheet disposed in the space, wherein the index sheet is fixedly interposed between the closure member and the main case body by closing the closure member relative to the main case body.

In accordance with the above mentioned case, it is possible to readily position an index sheet in the space only by opening the main case body and the closure member relative to each other, and also possible to fix an index sheet by interposing between the main case body and the closure member to thereby prevent slipping out of the case only by closing the main case body and the closure member relative to each other.

In a preferred embodiment, the main case body includes case sidewalls each of which is formed with a recessed portion for engagement thereinto, and the closure member includes closure member sidewalls each of which is formed with a resilient engagement portion engageable to the recessed portion and which are to inwardly align with the closure member sidewalls. When the disc cartridge is not received in the space, the resilient engagement portion shallowly received in the recessed portion supports both the main case body and the closure member so that they are able to open and close relative to each other, and when the disc cartridge is received in the space, the resilient engagement portion in compressed onto the disc cartridge to be deeply received in the recessed portion to thereby cause the main case body and the closure member to be close relative to each other and comes into engagement with the disc cartridge to thereby keep the disc cartridge in the space.

In accordance with the above mentioned preferred embodiment, while a disc cartridge is encased in the case, the main case body and closure member never open relative to each other to thereby ensure encasing a disc cartridge in the case.

BRIEF DESCRIPTION OF THE DRAWINGS

FIGS. 4A and 4B are schematic views for explanation of the operation of the MD cartridge encasing case illustrated in FIG. 3; and FIG. 5 is a perspective view of a conventional case for encasing a MD cartridge therein.

DETAILED DESCRIPTION OP THE PREFERRED EMBODIMENTS

Hereinbelow, with reference to the attached drawings, will be described a case for encasing a disc cartridge therein made in accordance with an embodiment of the present invention.

Figure 1:
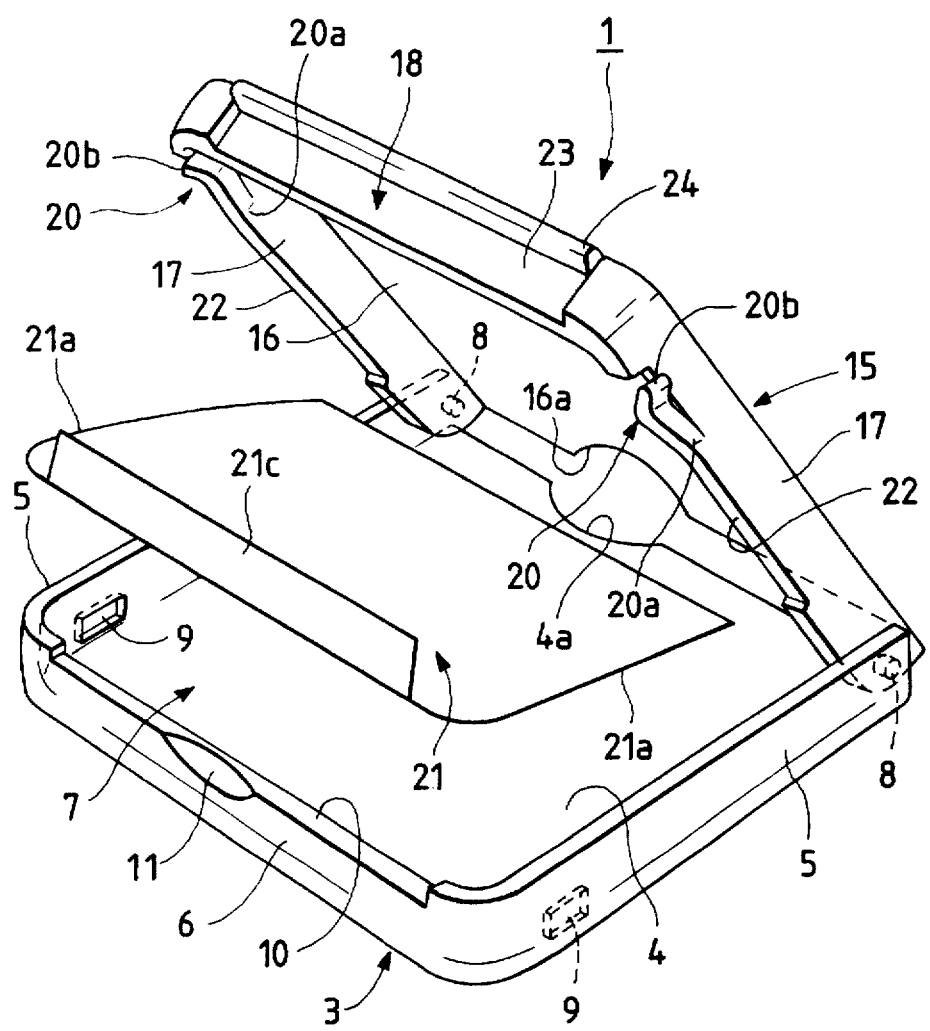
FIG. 1 is a perspective view illustrating a MD cartridge encasing case in open condition, made in accordance with the embodiment of the present invention.

As illustrated in FIG. 1, a case 1 for encasing a MD cartridge 2 (see FIG. 3) is formed of a thin parallelepipedon-shaped box including a main case body 3 and a closure member 15 designed to be able to be open and closed relative to the main case body.

The main case body 3 includes a bottom wall portion 4 formed at a front end thereof with an arcuate cut-out 4a, a pair of case sidewall portions 5, 5 standing at opposite edges of the bottom wall portion 4, and a case rear wall portion 6 standing at a rear end of the bottom wall portion 4 to thereby define a space 7 for receiving a disc cartridge therein which space is open upwardly.

The cartridge receiving space 7 is almost coextensive with the MD cartridge 2. Each of the case sidewall portion 5, 5 is formed at a front end thereof and on an inner surface thereof with a support shaft 8, and also formed at a rear end thereof and on an inner surface thereof with a recessed portion 9. The case rear wall portion 6 is formed with a recessed portion 10 into which a raised portion 24 (which will be detailed later), at which an operator is to hold a finger, formed at a rear end of the closure member 15 is to be fit, and a recessed portion 11 at which an operator can hold a finger.

The closure member 15 is made of transparent resin, and includes an upper wall portion 16 upwardly covering the main case body 3, a pair of closure member sidewall portions 17 which stand at opposite edges of the upper wall portion 16 and which is to inwardly align with the case sidewall portions 5, 5, and a closure member rear wall portion 18 which stands at a rear end of the upper wall portion 16 and which is to inwardly align with the case rear wall portion 6. The upper wall portion 16 is formed at a front end thereof with an arcuate cut-out 16a.

The closure member sidewall portions 17, 17 are formed with holes 19, 19 into which the shafts 8, 8 formed with the case sidewall portions 5, 5 are to be fit, lock crawls 20, 20 acting as resilient engagement members to keep the closure member 15 close to the main case body and also keep the MD cartridge 2 within the cartridge receiving space 7, and steps 22, 22 for receiving opposite side edges 21a, 21a of an index sheet 21 therein.

Figure 2:
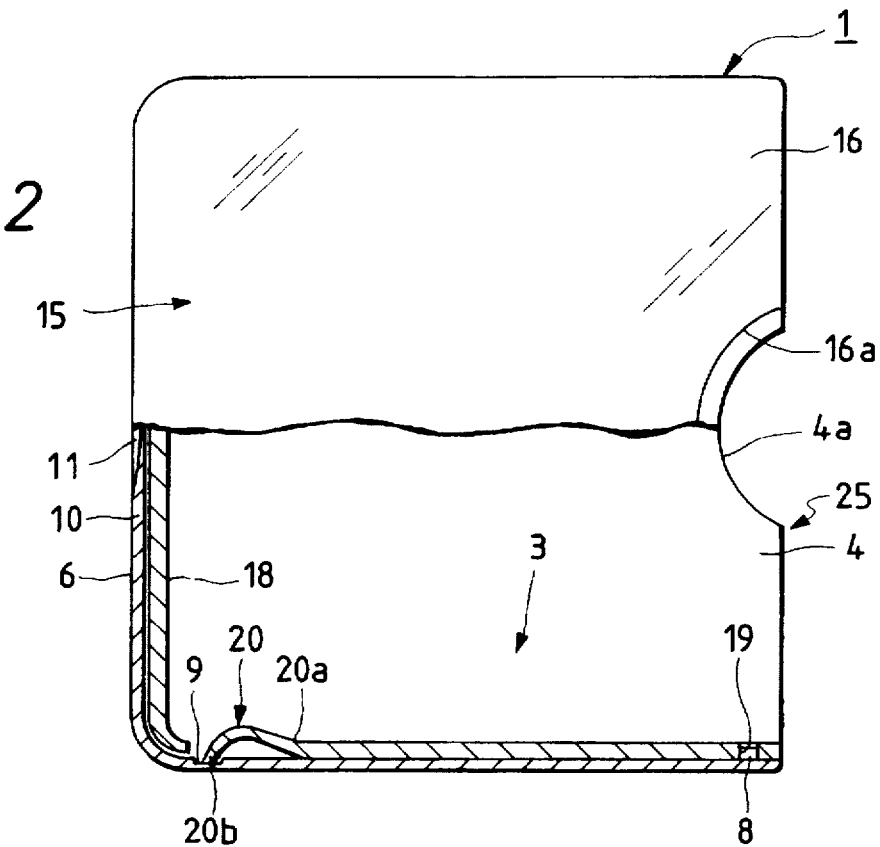
FIG. 2 is a partial cross-sectional view of the MD cartridge encasing case illustrated in FIG. 1.
Figure 3:
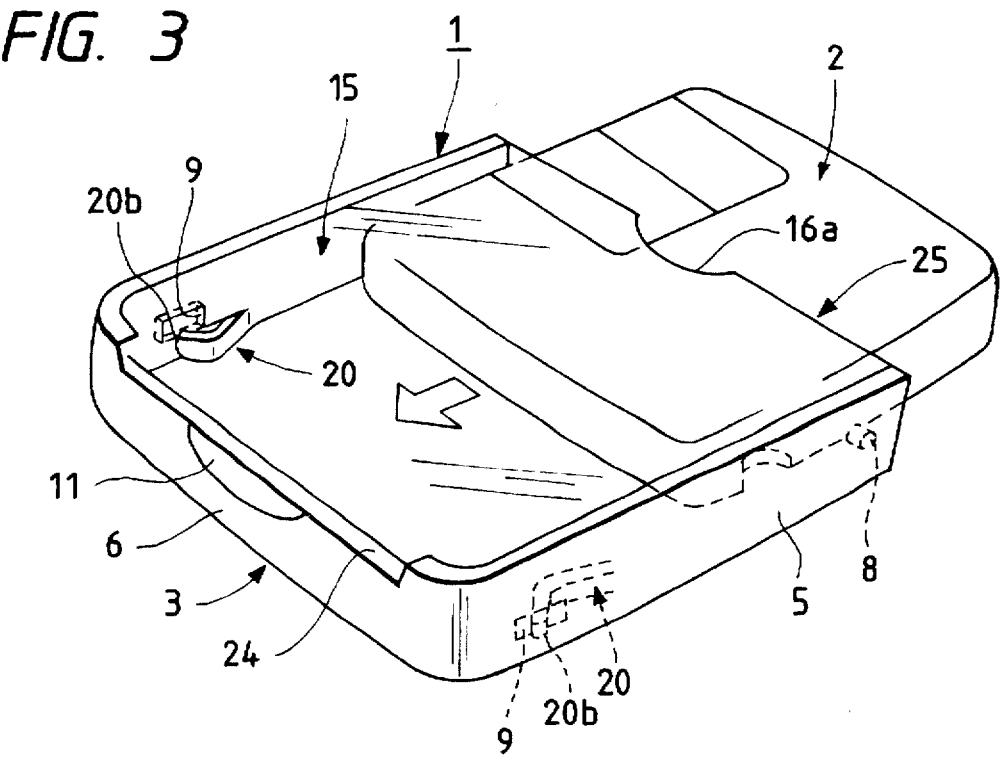
FIG. 3 is a schematic view showing a MD cartridge is being inserted into the MD cartridge encasing case.

As illustrated in FIG. 2, the closure member 15 is carried at the main case body for rotational movement about the shafts 8, 8 by fitting the shafts 8, 8 formed with the case sidewall portions 5, 5 into the holes 19, 19 formed with the closure member sidewall portions 17, 17. As illustrated in FIGS. 2 and 3, when the closure member 15 and the main case body 3 are closed relative to each other, there is formed an inlet opening 25 at a front end of the MD cartridge receiving case 1 which opening is in communication with the cartridge receiving space 7.

The lock crawls 20, 20 are formed bent so that a bending portion thereof is inwardly directed in a substantially angle shape, and have proximal ends 20a, 20a integrally formed with the closure member sidewall portions 17, 17. The lock crawls 20, 20 have distal ends 20b, 20b which are designed to be able to engage to the recessed portions 9, 9 formed at the case sidewall portions 5, 5. When the MD cartridge 2 is not received in the cartridge receiving space 7, the distal ends 20b, 20b of the lock crawls 20, 20 are shallowly fit into the recessed portions 9, 9.

The closure member rear wall portion 18 includes a recessed portion 23 for receiving therein a folded portion 21c of the index sheet 21, and a raised portion 24 at which an operator holds a finger and which is to fit into the recessed portion 10 of the main case body 3.

Hereinbelow will be explained the operation of the MD cartridge encasing case 1 constructed as described above.

First, when the index sheet 21 is to be placed into the MD cartridge encasing case 1, as illustrated in FIG. 1, the closure member 15 and the main case body 3 are made to rotate about the shafts 8, and then the index sheet 21 is placed in the cartridge receiving space 7 of the main case body 3.

Then, the closure member 15 and the main case body 3 are made to rotate about the shafts 8 to thereby close them relative to each other (see FIG. 3). Thus, the distal ends 20b, 20b of the lock crawls 20, 20 are fit into the recessed portions 9, 9 of the case sidewall portions 5, 5, thereby the closure member 15 being engaged to and thus locked to the main came body 3.

It should be noted that the distal ends 20b, 20b of the lock crawls 20, 20 are shallowly fit into the recessed portions 9, 9, and hence are able to engage to and disengage from the recessed portions 9,9.

The folded portion 21c of the index sheet 21 is interposed for fixation between the recessed portion 23 of the closure member rear wall portion 18 and the case rear wall portion 6, and the sidewall portions 21a, 21a are inserted into steps 22, 22 formed with the closure member sidewall portions 17, 17. Thus, the folded portion 21c and the sidewall portions 21a, 21a of the index sheet 21 are interposed between the case sidewall portions 5, 5 and the closure member sidewall portions 17, 17, which ensures that the index sheet 21 is kept in the cartridge receiving space 7.

When the index sheet 21 is to be taken out of the MD cartridge encasing case 1, the MD cartridge 2 is first taken out of the MD cartridge encasing case 1.

Hereinafter, an operator holds finger on both the recessed portion 11 of the case rear wall portion 6 and the raised portion 23 of the closure member rear wall portion 1B, and then pulls the raised portion 23 up. Since the distal ends 20b, 20b of the lock crawls 20, 20 are shallowly fit into the recessed portions 9, 9, the lock crawls 20, 20 can readily escape out of the recessed portions 9, 9. Then, the index sheet 21 can be taken out of the main case body 3 which has already been open.

Hereinbelow will be explained a case wherein the MD cartridge 2 is received in the MD cartridge encasing case 1.

As illustrated in FIG. 3, the MD cartridge 2 is inserted into the cartridge receiving space 7 through the inlet opening 25 with the closure member 15 and the main case body 3 being closed to each other. As illustrated in FIG. 4A, front corners 2a, 2a of the inserted MD cartridge 2 make contact with the bending portions of the lock crawls 20, 20 and outwardly push the lock crawls 20, 20. Thus, the distal ends 20b, 20b of the lock crawls 20, 20 which have been shallowly fit into the recessed portions 9, 9 are made deeply fit into the recessed portions 9, 9, and make contact with bottom surfaces of the recessed portions 9, 9. The distal ends 20b, 20b of the lock crawls 20, 20 are pushed to and stop at rear side edges of the recessed portions 9, 9, (see FIG. 4B).

As mentioned above, as the distal ends 20b, 20b of the lock crawls 20, 20 are deeply fit into the recessed portions 9, 9, the closure member 15 and the main case body 3 are surely locked to each other. Hence, the closure member 15 and the main case body 3 are not open to each other while the MD cartridge 2 is in the cartridge receiving space 7.

When the distal ends 20b, 20b of the lock crawls 20, 20 are deeply fit into the recessed portions 9, 9 and abut the bottom surfaces of the recessed portions 9, 9, the bending portions of the lock crawls 20, 20 are fit into recessed portions 2b, 2b formed at sidewall and close to a front with the MD cartridge 2. Thus, the MD cartridge 2 is kept from being slipped out of the cartridge receiving space 7 (see FIG. 4B).

Hence, while the disc cartridge 2 is loaded in the case 1, the main case body 3 and the-closure member 15 are not open relative to each other, and hence it is ensured that the disc cartridge 2 is loaded in the case 1.

The application of the case for encasing a disc cartridge therein made in accordance with the present invention is not to be limited to a case for encasing a MD cartridge therein in the above described embodiment, but the present invention is applicable also to a case for encasing other disc cartridges such as 3.5-inch floppy disc and an optical disc. The shapes of a closure member, main case body, resilient engagement portions and recessed portions are not to be limited to the shapes of the closure member 15 and the main case body 3 as described in the preferred embodiment, but can be made in any other forms.

As discussed so far, in accordance with the inventive case for encasing a disc cartridge therein, an index sheet can be readily placed in a cartridge receiving space by opening the main case body and the closure member relative to each other, and an index sheet can be fixed in interposed fashion to thereby prevent slippage thereof by closing the main case body and the closure member relative to each other.

Thus, there is now provided a case for encasing a disc cartridge therein which case is capable of readily placing an index sheet therein and preventing unintentional slippage of an index shoot.

What is claimed is:

1. An encasing structure comprising:

a disc cartridge to be encased;

a box-shaped body having a space for receiving the disc cartridge therein and an inlet opening which is disposed at a front end thereof and is in communication with said space for introducing said disc cartridge into said space, said box-shaped body comprising a main case body and a closure member which is enabled to open and close relative to said main case body; and an index sheet disposable in said space, wherein part of the index sheet is fixedly interposable between a rear wall portion of said closure member and a rear wall portion of said main case body by closing said closure member relative to said main case body.

2. The encasing structure of claim 1, wherein said main case body includes a pair of recessed portions respectively formed on a pair of sidewalls of said main case body, and said closure member includes a pair of resilient engagement portions respectively formed on a pair of sidewalls of said closure member for engaging with said mating recessed portion, to thereby maintain a closure state of said closure member relative to said main case body.

3. The encasing structure of claim 2, wherein an inserting amount of said resilient engagement portion into said mating recessed portion while said disc cartridge is outside said space is smaller than that of said resilient engagement into said mating recessed portion while said disc cartridge is received in said space.

4. The encasing structure of claim 3, wherein when said disc cartridge is received in said space, said resilient engagement portion is compressed onto said disc cartridge to be deeply received in said recessed portion so that said main case body and said closure member are closed relative to each other and said resilient engagement portion comes into engagement with said disc cartridge for holding said disc cartridge in said space.

* * * * *